United States Patent Office 2,995,747
Patented Aug. 8, 1961

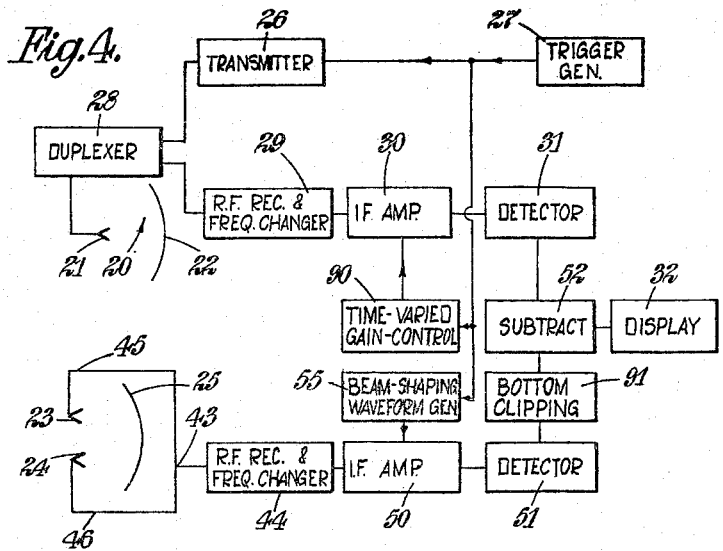
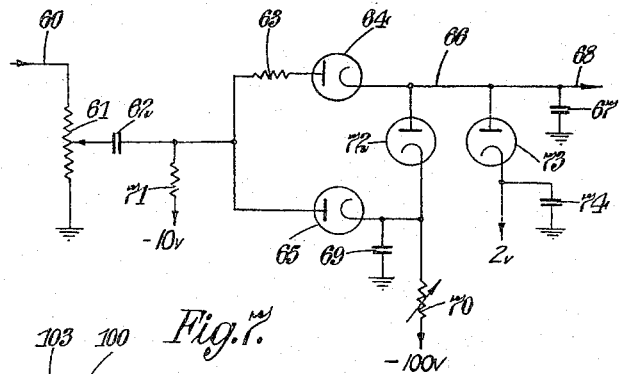
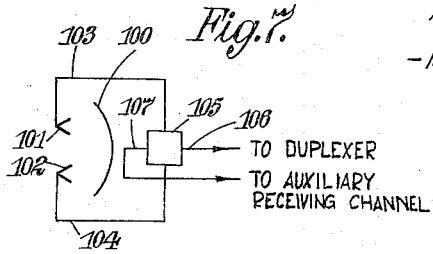

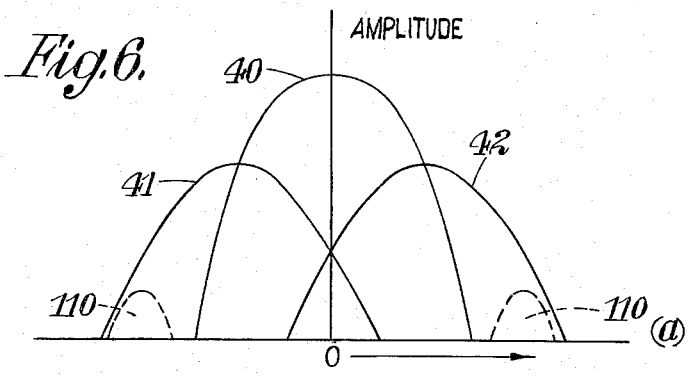
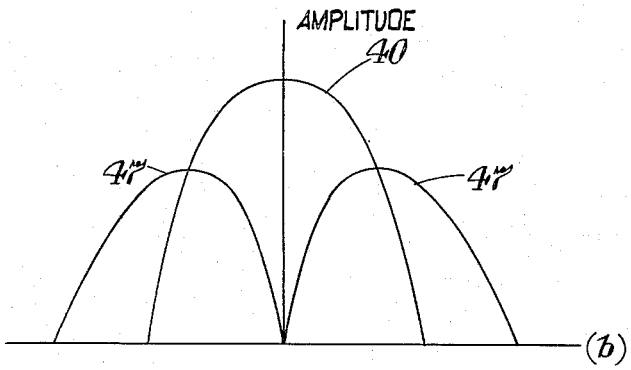
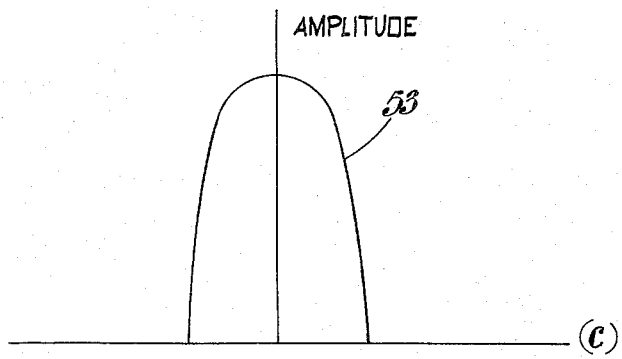
Fig.6.

2,995,747
PULSE RADAR APPARATUS
Maurice Henry Easy and Charles Freeman Robinson, London, England, assignors to The Decca Record Company Limited, London, England, a British company
Filed Apr. 7, 1958, Ser. No. 726,831
17 Claims. (Cl. 343—17.1)

This invention relates to pulse radar apparatus having a receiving aerial providing a sharply directional receiving beam which is cyclically scanned.

More particularly the invention relates to pulse radar apparatus having a main aerial system giving a single main directional receiving beam and an auxiliary aerial system giving two directional receiving beams in directions on either side of but overlapping the main beam so that, by subtractively combining after rectification the signals received by the main aerial system and the auxiliary aerial system, the effective receiving coverage width is reduced and, according to this invention, in such pulse radar apparatus, there is provided means for altering the relative amplitudes of the outputs of the two aerial systems cyclically in synchronism with the pulse repetition frequency so that the amplitude ratio varies with the range of the targets from which echoes are received. This arrangement permits of the effective receiving beam width to be varied with range and it is thus possible, for example, to reduce the effective beam width for close-in targets so giving better angular discrimination and reducing the effects of clutter from echoes of nearby objects whilst having a greater beam-width for distant targets so as to ensure the best detection of such distant targets which may only produce weak echoes at the radar receiving aerial.

In radar apparatus having a main aerial and auxiliary aerial system as set forth above, the signals from the main and auxiliary aerial systems may be combined, after rectification, at video frequency. The main aerial and the auxilary aerial system may make use of a common reflector and, very conveniently, there is provided a single reflector with a main receptor element, such as a horn, dipole, or the like, together with two auxiliary receptor elements arranged on either side of the main element. The outputs of the two auxiliary receptor elements may conveniently be combined with one another at the radio frequency by connecting them together to a common feeder by means of a common junction or a magic-T or other hybrid junction. The main aerial may be used for transmitting as well as receiving by using a duplexer.

In some cases, it may be inconvenient or impossible to utilise three horns with a single reflector, that is two horns for the auxiliary aerial system and one for the main aerial system. To avoid this difficulty, two horns may be employed, the outputs of the two horns being combined in phase at the radio frequency or at an intermediate frequency after frequency changing to constitute the main receiving aerial system and the outputs of the two horns being combined in antiphase at the radio frequency or at the intermediate frequency to constitute said auxiliary aerial system.

The aforementioned means for altering the relative amplitudes of the outputs from the two aerial systems may comprise means switching on and off signals from one of the aerial systems. Preferably, however, means are provided for effecting a gradual change in the relative amplitudes of the outputs from the two aerial systems in accordance with the range of the targets from which echoes are received, that is to say the relative amplitudes vary gradually with time cyclically in the pulse repetition period. The relative amplitudes would usually be varied by control of the amplitude of the output from the auxiliary aerial system, the output of the main aerial being kept at a maximum to give the best radar sensitivity. However, as described below, an anti-clutter gain control giving time-varied gain may be provided for reducing the gain of the main aerial receiving system and, if necessary, the auxiliary aerial system at short ranges to further reduce clutter.

For marine radar systems or for coastal radar systems adjacent the sea in which the beam is sharply directional in the horizontal plane and is scanned in that plane, it would, in general, be preferred to provide a constant amplitude ratio giving minimum effective beam width up to the maximum range of sea clutter. Beyond this range, the amplitude ratio may be varied either linearly or non-linearly so that the effective coverage width increases with range to a maximum occurring at or before the maximum range of operation. By this arrangement the effects of sea clutter are reduced by reducing the effective beam width, but at longer ranges the beam width is increased so as to prevent any unnecessary reduction in the strength of received signals. Preferably, means are provided for varying the relationship between range and the relative amplitudes of the outputs from the two aerial systems.

In an arrangement such as has been described above in which the relative amplitude is varied with range, conveniently the gain of the receiver fed from the auxiliary aerial system is reduced as the range is increased, whilst the gain of the receiver fed from the main aerial system is maintained at its maximum value, although the gain of the receiver fed from the main aerial system and, if necessary, of the receiver fed from the auxiliary aerial system may be reduced at short ranges, as indicated above, by a conventional type of anti-clutter gain control to prevent saturation. It will be appreciated that the variation of effective beam width with range may be used quite independently of or in addition to any time varied gain control for reducing clutter at short ranges.

In order to vary the relative gains of the two receiving systems, conveniently the outputs of these two receiving systems are combined at video frequency, separate radio frequency and intermediate frequency channels being provided for the two aerial systems, and the relative amplitudes of the outputs being varied by adjusting the gains of the intermediate frequency amplifier stages. This may be done by applying a time-varied control waveform, which may be similar to that employed in time-varied gain control systems, to one or more of the amplifier valves.

In an arrangement in which the signals from the main and auxiliary aerial systems are combined, after rectification, at video frequency, the aforementioned auxiliary aerial system preferably comprises two auxiliary aerials giving said two directional receiving beams, the auxiliary aerials being arranged so that their directional beams overlap in the region of the centre of the main directional beam and means are provided for combining the outputs of the two auxiliary aerials together, either at the received radio frequency or at an intermediate frequency after frequency changing, in such phase relationship that the signals received by the two auxiliary aerials from directions in the overlapping region of the auxiliary beams tend to cancel one another. The combined radio frequency or intermediate frequency signals are then rectified and combined with the rectified output of the main aerial system. If the outputs of the auxiliary aerials were simply rectified and then combined with the rectified output of the main aerial, in order to avoid any substantial reduction in the amplitude of signals received by the main aerial from a direction in the centre of the main beam, it is essential that the two auxiliary aerials have substantially zero pick-up in this direction. Since, for practical reasons, the beam width of the auxiliary aerials is usually limited, this condition necessitates that the auxiliary aerial beams must be directed in directions angularly displaced from the direction of the main beam by a certain minimum angle dependent on the beam width of the auxiliary beams. Even if the beam widths of each of the auxiliary beams is as narrow as that of the main beam, the auxiliary aerials cannot be positioned to reduce the effective angular coverage width of the combined receiving system as much as is desired and thus the reduction in this angular coverage width is necessarily limited. With the arrangement of the present invention, the beams from the auxiliary aerials overlap and thus there is no such inherent limitation on the angular positioning of the auxiliary beams with respect to the main beam. Since the signals from the auxiliary aerials are combined in a phase relationship such that they tend to cancel one another, the amplitude of the combined radio frequency or intermediate frequency signals received by the auxiliary aerials, assuming these two aerials have similar properties and are symmetrically arranged with respect to the main aerial, would be zero for signals from the direction of the centre of the main beam and thus the combined radio frequency or intermediate frequency signals, after rectification cannot reduce the amplitude of signals received from this direction by the main aerial.

As previously indicated, the aerial systems may be arranged to give a beam which is sharply directional in the horizontal plane and the beam cyclically scanned in that plane. Alternatively, particularly for height finding radar equipment, the aerial systems may be arranged to give a beam which is sharply directional in the vertical plane. For some purposes, said aerial systems may be arranged to give a beam which is sharply directional in both the horizontal and vertical planes, the auxiliary aerial system in this case being arranged to give directional beams on the two sides of the main beam in the horizontal plane and two further beams respectively above and below the main beam. Such an arrangement giving a beam which is sharply directional in two planes may be used for example in radar apparatus for measuring both bearing and elevation e.g. apparatus employing a narrow sector search in azimuth and elevation.

To effect the combination of signals from the two auxiliary aerials in the appropriate phase relationship, the two auxiliary aerials may be connected to a common feeder by connections having lengths differing by half a wavelength so that the two outputs are combined in the required phase relationship. For microwave frequencies a common junction or a magic-T or other hybrid coupling may be used for effecting this combination. The common feeder may lead to a single receiving and rectifying system for rectifying the combined output of the auxiliary aerials. Alternatively the two auxiliary aerials may be connected to a common feeder by two feeders of equal length with a twist in one of these two connecting feeders so as to reverse the relative phase of the signals.

Bottom clipping may be applied to the signals from the auxiliary aerials after they have been combined with one another but before being combined with the signals from the main aerial thereby cutting off the noise in this channel so reducing the loss in the overall signal-to-noise ratio inherent in the system due to the addition of the noise in the two channels. Furthermore this bottom clipping will square off the cusp in the null of the auxiliary aerial channel so giving zero output from this channel over a small angular bearing so that, when these signals are subtracted from those in the main aerial channel, the effective beam pattern produced is square-nosed and may have very steep sides falling sharply to zero thereby maintaining the sensitivity substantially constant over the whole effective width of the beam.

The following is a description of one embodiment of the invention, reference being made to the accompanying drawings in which:

FIGURE 4 is a block diagram of one form of radar apparatus embodying the invention;

FIGURE 5 is a circuit diagram of part of the radar apparatus of FIGURE 4;

FIGURE 6 comprises three explanatory diagrams; and

FIGURE 7 is a diagram illustrating a modified aerial system.

Figure 1:
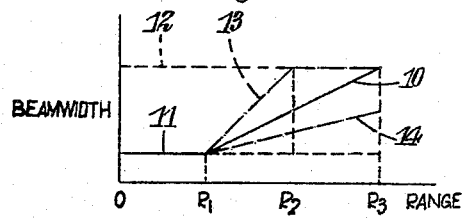
FIGURES 1, 2 and 3 are diagrams illustrating required variations, with range, of beam width, gain and bias respectively.

Referring to FIGURE 1, the full line curve 10 represents one example of a required variation of beam width with range for a plan position pulse radar apparatus embodying the invention. Up to a range $R_1$ the beam width is kept constant, as indicated by the horizontal straight line portion 11 of the curve 10, this beam width being relatively narrow. In the case of marine or coastal radar the range $R_1$ is conveniently the maximum range of sea clutter. Beyond this range $R_1$ up to the maximum range of the radar apparatus, the beam width increases gradually up to a maximum value indicated by the dotted line 12. The dash lines 13 and 14 indicate two other examples of possible relationships between beam width and range indicative of possible variations that might be required. In the case of the relationship indicated by the line 13, the beam width reaches a maximum at some range $R_2$ less than the maximum range $R_3$ of the radar apparatus and thereafter remains constant at the maximum value indicated by the dotted line 12. In the relationship indicated by line 14, the beam width even at maximum range is still maintained relatively narrow compared with that indicated by lines 11 and 13.

To produce such a variable beam width, the radar apparatus, as illustrated in FIGURE 4, has a main receiving aerial 20 comprising a receptor element 21, such as a horn or dipole, co-operating with a reflector 22 and also has two auxiliary aerials illustrated as comprising receptor elements 23, 24 co-operating with a reflector 25. Separate reflectors 22 and 25 are illustrated in FIGURE 4 for convenience, but it may be preferable in practice to utilise a common reflector element for all the aerials. A transmitter 26 produces short duration repetitive microwave pulses at instants determined by the output of a trigger pulse generator 27 and the output from the transmitter is illustrated in FIGURE 1 as being fed to the main aerial 20 through a duplexer 28. A separate transmitting aerial may, however, be employed if desired. Echoes of distant targets received by the main aerial 20, after passing through the duplexer 28, are fed to a radio frequency receiver and frequency changing unit 29 and thence to an intermediate frequency amplifier 30. The output from the intermediate frequency amplifier 30 is detected by a detector 31 and the video output signals from the detector are combined with further signals as hereinafter described and are fed to a display unit 32.

The main aerial 20 is arranged to produce a directional beam which is illustrated diagrammatically in FIGURES 6a and b by the curves 40, which curves represent the relationship between the signal amplitude and the angular deviation from the axis of the beam. The two auxiliary aerials 23, 24 are arranged to produce beams which are directed at angles on either side of the main beam, these auxiliary aerial beams being indicated by the curves 41 and 42 in FIGURE 6a which curves represent the signal amplitudes at the receptor elements 23, 24 plotted against angular direction. It will be seen that the two curves 41, 42 overlap in the region of the middle of the main beam 40. The outputs from two receptor elements 23, 24 are combined by a simple waveguide junction unit 43, or by a hybrid unit such as a magic-T, and thence fed to a radio frequency receiver and frequency changing unit 44. The feeds 45, 46 from the receptor elements 23, 24 respectively to the junction unit 43 are arranged to be of different length or to be twisted so that the radio frequency signals from the two receptor elements are in phase opposition when they are combined. Thus in the region of the centre of the main beam 40 the outputs from the two receptor elements 23, 24 will tend to cancel one another so that the combined output of these two receptor elements is represented by the double peak curve 47 in FIGURE 6b which has a sharp cusp at the direction corresponding to the centre of the main beam 40. If the receptor elements 23, 24 are spaced apart in the plane in which the beam is to be sharply directional, then the phase relationship of the signals received by these two receptor elements will depend on the angular direction in which the signals are received. Provided, however, the connections to the junction unit 43 are made such that the feeds thereto are in opposite phase when signals are received from the direction of the centre of the main beam 40, it is then immaterial if the signals are not exactly in phase at directions off the centre of the main beam. In fact such out-of-phase relationship will tend to sharpen the overall coverage pattern of the whole receiving system.

There is a practical limit to the narrowing of the effective coverage diagram in that the response on the radar display from a weakly reflecting target will become less if the number of pulse echoes received from it becomes very small. If it is desired to obtain a high degree of accuracy in determining the bearing of such a weakly reflecting target (as distinct from obtaining maximum angular resolution) the auxiliary aerials may be arranged to have a sharp null and switching means provided for switching off the signals from the main aerial and for reversing the polarity of the video signals from the auxiliary aerials so that the signals from the auxiliary aerials are displayed on a plan position radar display. The resulting echoes as seen on the screen will be somewhat broader in angular width than from the main aerial on its own but will show a sharp null, at the centre of the echo arc, from which the bearing of the echo may be accurately read. Since the effective beam width is larger, the radar sensitivity will be good. Because the null in the middle of the echo may approach zero very closely, accurate readings of bearing may be obtained also on very strong targets which may be saturating the receiver. The closeness of the approach to zero at the null will depend on the exactness of the phase relationship of the signals from the auxiliary aerials when they are combined. However, departure from the ideal affects only the sharpness of the null and not the angular position of the null.

The output from the radio frequency receiver and frequency changing unit 44 is fed to an intermediate frequency amplifier 50 and thence to a detector 51 the video output of which is subtracted from the output of the aforementioned detector 31 in a subtractor unit 52 before the combined signal is fed to the display 32. The effect of such a subtraction of signals on the effective coverage diagram is illustrated in FIGURE 6c in which the curve 53 illustrates the effective beam width which is very much narrower than the beam width of the curve 40 of FIGURE 6a. The narrowing of the beam width can be controlled by varying the amplitude of the signals from the auxiliary aerials fed to the subtracting unit 52.

It will be immediately apparent that if this output is reduced to zero then the beam width will be the full width illustrated by the curve 40 in FIGURES 6a, 6b. Theoretically such control of the beam width may be effected by controlling the gain of either the main receiving channel or the auxiliary receiving channel or both, but it is preferred to maintain the gain of the main receiving channel at a maximum and to alter the gain of the auxiliary receiving channel as required so as to maintain maximum sensitivity in the centre of the main beam.

Referring to FIGURE 4, for controlling the beam width, there is provided a beam shaping waveform generator 55 controlling the gain of the intermediate frequency amplifier 50. One form of circuit for such a waveform generator is illustrated in FIGURE 5 in which there is shown an input 60 to which are applied large positive going short duration trigger pulses from the trigger pulse generator 27 synchronised with the transmitter pulses. These pulses to the input 60 are applied across a potentiometer 61 and a tapped portion of the voltage across this potentiometer is applied through a capacitor 62 to the junction of two circuits, the first of which leads through a fixed resistor 63 to the anode of a first diode 64 and the second leads directly to the anode of a second diode 65. The cathode of the diode 64 is connected to a gain control line 66 which line is connected to one plate of a capacitor 67, the other plate of which is earthed. The gain control line 66 leads to the output circuit 68 of the waveform generator. The cathode of the diode 65 is connected to one plate of a capacitor 69, the other plate of which is earthed and is also connected through a variable resistor 70 to a source of relatively large negative potential, which in a typical case may be —100 volts. The plate of the capacitor 62 which is connected to the resistor 63 and the anode of the diode 65 is also connected through a fixed resistor 71 to a second source of bias potential of smaller value than the first source, in a typical case —10 volts. The gain control line 66 and thus the cathode of the first diode 64 is connected to the anode of a third diode 72 the cathode of which is connected to the cathode of the second diode 65. The cathode of the first diode 64 is also connected to the anode of a fourth diode 73, the cathode of which is biased at a small potential, in a typical case —2 volts. The cathode of this fourth diode 73 is also connected to earth through a further capacitor 74.

When a positive pulse is applied across the potentiometer 61, this pulse passes through the capacitor 62 and through the first diode 64 to the gain control line 66 rapidly charging the capacitor 67 in the positive direction. When the gain control line potential reaches that of the bias source connected to the cathode of the diode 73 this diode conducts preventing any further rise in the gain control line potential. This action is aided by the voltage drop across the fixed resistor 63 which, however, must not be so large as to prevent the gain control line 66 reaching the bias potential of the diode 73. At the conclusion of the pulse the gain control line potential will remain at this value but the anode of the diode 64 will fall to some potential below its bias hence making this diode non-conducting. In the meantime the pulse will also pass through the second diode 65 charging the capacitor 69 in the positive direction and, since there is no limiting resistor in the circuit, this capacitor 69 will reach a somewhat more positive potential than that of the gain control line 66. Thus, at the termination of the pulse, the diode 65 will become non-conductive and the capacitor 69 will begin to discharge slowly through the resistor 70 into the negative bias source connected to that resistor. However, when the potential on the capacitor 69 reaches that of the gain control line 66, the diode 72 will begin to conduct and the potential on the output line 68 will fall as the capacitor 67 slowly discharges through the resistor 70. The beginning of conduction of the diode 72 is arranged to coincide with the maximum range to which it is desired to suppress sea clutter, this being done by adjustment of the input pulse amplitude by means of the potentiometer 61. The discharge of the capacitor 67 continues until the gain control line 66 has reached the potential set by the bias on the anodes of the diodes 64, 65 whereupon the latter conducts. The fixed resistor 71 in series with the connection between the anode of the diode 65 and the source of anode bias potential is made very small in comparison with the variable resistor 70 so that there is negligible voltage drop across the resistor 71; hence the gain control line 66 is held at the potential of the bias source connected to the resistor 71. This potential is arranged to be approximately that of which the receiving channel for the auxiliary aerial system has negligible gain. Variation of the adjustable resistor 70 has the effect of altering the rate of change of relative gain and hence may be used to vary the range at which the maximum beam width is obtained.

Figure 2:
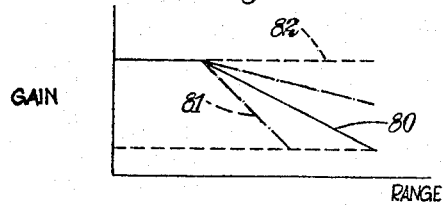
Figure 3:
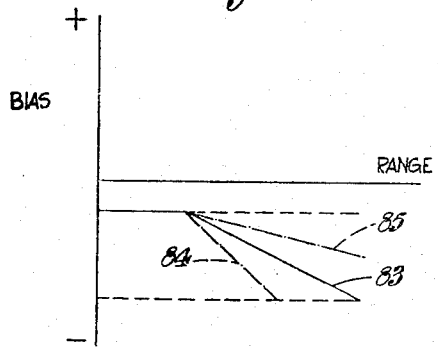

FIGURE 2 illustrates with the full line 80 the variation of gain with range required to give the beam width characteristic illustrated by the full line 10 in FIGURE 1. The dash lines 81 and 82 in FIGURE 2 illustrate the variations of gain required to give the characteristics indicated by the lines 13 and 14 in FIGURE 1. To produce these variations in gain the bias on the amplifier 50 must vary in a manner illustrated in FIGURE 3 in which the full line curve 83 illustrates the variation of bias corresponding to the curve 80 of FIGURE 2 and the dash lines 84, 85 show the variations of bias corresponding to the gain variations represented by the lines 81, 82. It will be seen that the waveform generating circuit of FIGURE 5 will produce the required bias waveforms illustrated in FIGURE 3.

To obtain maximum beam width at all ranges it is only necessary to switch off the input pulse to the input 60 of FIGURE 5. To obtain minimum beam width at all ranges it is merely necessary to reduce the bias on the diodes 64, 65 applied through the fixed resistor 71 to the bias applied to the diode 73. Conveniently a three position switch (not shown) may be provided which controls the application of the input pulses and switches the fixed resistor 71 from one bias source to the other, the intermediate position giving variable rate of change of effective beam width.

The above-mentioned three position switch may be manually operable so that the effective beam width may be controlled as desired. In some cases, however, it may be replaced by a switching device arranged to be operated in synchronism with the rotation of the aerial so that the time-varied beam shaping is confined to one or more sectors of the aerial scan whilst the other sectors have maximum or minimum beam width as required. Remote control means may be provided to enable the operator at his operating position to select the sector widths and positions.

It will be seen that it is possible for any selected area of the display to contain signals of any required beam width (within the limits of the aerial system) whilst the remainder of the display has some other suitable beam width/range law.

Although in the foregoing reference has been made more particularly to the desirability of reducing the beam width at short ranges to reduce the effects of sea clutter, in radar apparatus where the reduction of sea clutter or other short range responses is not an over-riding consideration, other relationships between range and beamwidth may be desired. For example, the beam width may be decreased with range to maintain constant the linear width on the display of all targets, regardless of range, thus maintaining the resolution constant over the whole area of the display.

There is also illustrated in FIGURE 4 a time varied gain control unit 90 which is triggered from the aforementioned trigger generator 27 and which controls the gain of the intermediate frequency amplifier 30 in the main receiving channel so as to reduce the gain for short ranges. This gain control unit 90 thus constitutes an anti-clutter gain control of the known type.

There is also illustrated in FIGURE 4 a bottom clipping circuit 91 for removing noise from the output of the detector 51 before this output is fed to the subtracting unit 52. By cutting off the noise in the auxiliary aerial channel in this manner, the loss in the overall signal to noise ratio inherent in a system due to the addition of the noise in two channels is reduced. Furthermore this bottom clipping will square off the cusp in the null of the auxiliary aerial channel so giving zero output from this channel over a small angular bearing. Thus when the signals from the auxiliary aerial channel are subtracted from this in the main aerial channel, the effective beam produced is square-nosed and may have very steep sides falling sharply to zero, thereby maintaining the sensitivity substantially constant over the whole effective width of the beam.

Bottom clipping may also be applied to the combined signals following the subtracting unit 52, in order to remove the negative-going signals and noise which would otherwise upset D.C. restoration in the following circuits.

With the above described arrangement, the beam width for near targets can be reduced without change of the aerial gain so reducing the signals returned by sea clutter without affecting the strength of signals from discrete targets such as small boats and buoys. On the other hand, at long ranges, a wider beam width is provided for best detection of weak targets. The characteristic relationship between beam width and range can be changed by adjustment of the resistor 70, to enable a desired characteristic to be obtained. Although one particular form of waveform generator has been described with reference to FIGURE 5, it will be appreciated that waveform generators having other output waveforms, e.g. non-linear waveforms may be employed if desired.

The use of the waveform generator 55 of FIGURE 4 may make the use of the anti-clutter gain control unit 90 unnecessary but does not affect its operation. This unit 90 serves, if the clutter signals are still very strong, to prevent saturation of the receiver and thus to enable wanted echoes to be seen on top of the clutter.

Although in FIGURE 4, the signals from the two horns 23, 24 are combined at the radio frequency, they might be combined at the intermediate frequency or at the video frequency. If they are combined at the video frequency, however, it is not possible to make use of the phase relationship of the radio frequency components to obtain the null in the curve 47 of FIGURE 6(b). However, by combination at the intermediate or video frequency, the gains of the two signals may be separately controlled before combination with identical or different waveforms giving the possibility of an asymmetrically shaped effective beam width, which may be particularly desirable if for beam shaping in the vertical plane.

With some types of receiver, for example, log-linear receivers or receivers having I.A.G.C., it may be necessary to control the receiver gain in a video amplifier stage. More generally, the gain may be controlled at the intermediate frequency or, by the use of ferrite attenuators or radio frequency amplifier valves, at the radio frequency.

Although with reference to FIGURE 4, the aerial system has been described as having three horns, one for the main beam and two for the auxiliary beams, there may be difficulty in arranging three horns for use with a common reflector. In that case, it is possible to use only two horns as illustrated in FIGURE 7. Referring to that figure, there is illustrated a reflector 100 with two horns 101, 102, which are connected by feeds 103, 104 respectively to two symmetrical inputs of a hybrid unit 105. This hybrid unit, which may for example be a magic-T or a rat-race or a 3 db directional coupler, provides one output 106 in which the signals from the horns 101, 102 are combined in phase and a second output 107 in which the signals are combined in phase opposition. The output 106 is connected to the duplexer 28 of FIGURE 4 and the output 107 to the receiver 44. Thus the two horns are utilised in phase for transmission and to provide the main receiving beam and are utilised in phase opposition to provide the auxiliary beams.

In the foregoing description with reference to the drawings, the directional beam has been made sharply directional in the horizontal plane and has been scanned cyclically in that plane. It will be readily apparent that by arranging the horns 23, 24 above and below the horn 21 or by making the horns 101, 102 of FIGURE 7 lie one above the other, the beam may be made sharply directional in the vertical plane. The beam may be made sharply directional in both the horizontal and vertical planes by using four horns for the auxiliary aerial system, one above, one below, and one on each side of the horn for the main beam. These horns may be utilised also for the main beam in a manner analogous to that described with reference to FIGURE 7, for example, the outputs of the top and bottom horns may be combined in a hybrid device and the in-phase combination added to the in-phase combined signals from a second hybrid device combining the outputs from the other two horns to provide the main beam. The out-of-phase components from the two hybrid devices are additively combined at video frequency to provide the required auxiliary receiving channel input. Bottom clipping may be applied in both the auxiliary channels before they are additively combined or alternatively to the combined signals before they are fed to the subtracting unit.

The arrangements described above in which the beam is made sharply directional in one or both planes are particularly valuable in radar apparatus subject to interference since interfering signals received in side lobes, such as those indicated by the dashed lines 110 of FIGURE 6a, are rejected completely, making it possible to detect and determine the range of a target which is close to the same angular direction as the source of interference. Also because of the rejection of side lobe signals, it is much easier to determine unambiguously the direction of a strong interfering signal.

We claim:

1. In pulse radar apparatus having means for radiating regularly repetitive pulse signals; the combination of an aerial system arranged for reception of echo signals in a single main directional receiving beam and also for the separate reception of auxiliary beam signals from directions on each side of and overlapping the main beam, rectifying means for separately rectifying the main beam and auxiliary beam signal, combining means fed with signals from said rectifying means for combining the rectified main beam and auxiliary beam signals from said rectifying means, and means synchronized with the radiated pulses operative to vary the proportions of the rectified signals fed from said rectifying means to said combining means in synchronism with the pulse repetition frequency so that the amplitude ratio of the signals being combined varies with the range of the targets from which echoes are received.

2. The combination as claimed in claim 1 wherein said rectifying means are arranged to produce separate video frequency output signals from the main and auxiliary beams and wherein said combining means are arranged subtractively to combine the video frequency outputs from said rectifying means.

3. In pulse radar apparatus having means for radiating regularly repetitive pulse signals; the combination of an aerial system arranged for reception of echo signals in a main directional receiving beam and also for the separate reception of auxiliary beam signals from a different direction overlapping the main beam, combining means for combining the main beam and auxiliary beam signals in controllable proportions to vary the effective receiving coverage width, and control means for said combining means synchronized with the radiated pulses for varying the proportions of the signals combined in said combining means in synchronism with the pulse repetition frequency so that the amplitude ratio of the signals being combined varies with the range of the targets from which echoes are received.

4. In pulse radar apparatus having means for radiating regularly repetitive pulse signals; the combination of a main aerial system arranged to receive signals in a single main directional receiving beam, an auxiliary aerial system arranged to receive signals from directions on each side of and overlapping the main beam, combining means for combining the main beam and auxiliary beam signals in controllable proportions to vary the effective receiving coverage width, and control means for said combining means synchronized with the radiated pulses for varying the proportions of the signals combined in said combining means in synchronism with the pulse repetition frequency so that the amplitude ratio of the signals being combined varies with the range of the targets from which echoes are received.

5. In pulse radar apparatus having means for radiating regularly repetitive pulse signals; the combination of a main aerial system arranged to receive signals in a single main directional receiving beam, an auxiliary aerial system arranged to receive signals from directions on each side of and overlapping the main beam, rectifying means for separately rectifying the main beam and auxiliary beam signals, combining means fed with signals from said rectifying means for combining the rectified main beam and auxiliary beam signals from said rectifying means, and means synchronized with the radiated pulses operative to vary the proportions of the rectified signals fed from said rectifying means to said combining means in synchronism with the pulse repetition frequency so that the amplitude radio of the signals being combined varies with the range of the targets from which echoes are received.

6. In pulse radar apparatus having means for radiating regularly repetitive pulse signals; the combination of an aerial system arranged for reception of echo signals in a main directional receiving beam and also for the separate reception of auxiliary beam signals from a different direction overlapping the main beam, separate receivers, each having a radio frequency amplifier, a frequency changer stage and an intermediate frequency amplifier coupled to said aerial system for each of said main beam and auxiliary beam signals, at least one of said intermediate frequency amplifiers having a stage with controllable gain, rectifying means for separately rectifying the main beam and auxiliary beam signals from said intermediate frequency amplifiers, combining means fed with signals from said rectifying means for combining the rectified main beam and auxiliary beam signals from said rectifying means, and means synchronized with the radiated pulses operative to vary the gain of said controllable gain intermediate amplifier stage in synchronism with the pulse repetition frequency so that the amplitude ratio of the signals being combined varies with the range of the targets from which echoes are received.

7. In pulse radar apparatus having means for radiating regularly repetitive pulse signals; the combination of an aerial system arranged for reception of echo signals in a main directional receiving beam and also for the separate reception of auxiliary beam signals from a different direction overlapping the main beam, separate receivers coupled to said aerial system for amplifying and rectifying the received main beam and auxiliary beam signals to provide separate video frequency output signals, at least one of said receivers including control means for varying the amplitude of the output signal, combining means fed with signals from said receivers for subtractively combining said separate video frequency output signals, and means synchronized with the radiated pulses operatively connected to said control means to vary the amplitude ratio of the signals being combined in synchronism with the pulse repetition frequency.

8. In pulse radar apparatus having means for radiating regularly repetitive pulse signals; the combination of an aerial system arranged for reception of echo signals in a main directional receiving beam and also for the separate reception of auxiliary beam signals from a different direction overlapping the main beam, a first receiver circuit coupled to said aerial system for amplifying and rectifying the received main beam signals to provide a first video frequency output, a second receiver circuit coupled to said aerial system for amplifying and rectifying the received auxiliary beam signals to provide a second video frequency output, said second receiver circuit including means responsive to an applied signal for varying the amplitude of said second video frequency output in accordance with said applied signal, combining means coupled to said receiver circuits for subtractively combining said first and said second video frequency outputs, a control waveform generator synchronized with the radiated pulses operative to produce an amplitude control signal varying in synchronism with the pulse repetition frequency, and means for applying said amplitude control signal to said second receiver circuit as a control signal to control the amplitude of said second video frequency output signal.

9. The combination as claimed in claim 8 wherein said control waveform generator is arranged to produce a time varying waveform reducing the amplitude of said second video frequency output gradually during at least part of each time interval between successive radiated pulses.

10. The combination as claimed in claim 8 wherein said control waveform generator is arranged to produce a waveform maintaining a constant ratio of the amplitudes of the first and second video frequency outputs up to a predetermined maximum range and gradually decreasing the amplitude of the second video frequency output relative to the first beyond this range.

11. The combination as claimed in claim 10 wherein control means are provided on said control waveform generator for adjusting the output waveform of the generator.

12. The combination as claimed in claim 10 wherein an anti-clutter gain control circuit giving a time varied gain is coupled to said first receiver circuit to reduce the gain of said first receiver for a time period corresponding to relatively short ranges.

13. In pulse radar apparatus having means for radiating regularly repetitive pulse signals; the combination of an aerial system arranged for reception of echo signals in a single main directional receiving beam and also for the separate reception of auxiliary beam signals from directions on each side of and overlapping the main beam, a first receiver coupled to said aerial system for receiving and rectifying the main beam signals to produce a first video frequency output signal, a second receiver coupled to said aerial system for receiving and rectifying the auxiliary beam signals to produce a second video frequency output signal, said second receiver including a frequency changer stage and a controllable gain intermediate frequency amplifier stage the gain of which can be varied by an applied gain control signal, combining means for subtractively combining the first and second video frequency output signals, a waveform generator synchronized with the radiated pulses operative to produce a control waveform varying cyclically at the pulse repetition frequency, and means for applying said control waveform from said waveform generator to said controllable gain intermediate frequency amplifier stage as a gain control signal to reduce the gain of said intermediate frequency amplifier stage gradually over at least part of the time period between successive radiated pulses.

14. In pulse radar apparatus having means for radiating regularly repetitive pulse signals; the combination of a main aerial system arranged for reception of echo signals in a single main directional beam which is sharply directional in the horizontal plane, an auxiliary aerial system for reception of echo signals in auxiliary beams one on each side of the main beam and overlapping the main beam, a first receiver coupled to said main aerial system for receiving and rectifying the main beam signals to produce a first video frequency output signal, a second receiver coupled to said auxiliary aerial system for receiving and rectifying the auxiliary beam signals to produce a second video frequency output signal, said second receiver including a frequency changer stage and a controllable gain intermediate frequency amplifier stage the gain of which can be varied by an applied gain control signal, combining means for subtractively combining the first and second video frequency output signals, a waveform generator synchronized with the radiated pulses operative to produce a control waveform varying cyclically at the pulse repetition frequency, and means for applying said control waveform from said waveform generator to said controllable gain intermediate frequency amplifier stage as a gain control signal to reduce the gain of said intermediate frequency amplifier stage gradually over at least part of the time period between successive radiated pulses.

15. The combination as claimed in claim 14 wherein said main and auxiliary aerial systems comprise a plurality of receiving horns with a common reflector for reflecting received signals into said horns.

16. The combination as claimed in claim 14 wherein said auxiliary aerial system comprises two auxiliary aerials providing two separate auxiliary receiving beams, said auxiliary aerials being arranged so that their directional beams overlap in the region of the center of said main directional beam and wherein means are provided arranged to combine the outputs of the two auxiliary aerials in such phase relationship that the signals received by the two auxiliary aerials from directions in the overlapping region of the auxiliary beams tend to cancel one another and wherein means are provided for feeding the combined outputs of the two auxiliary aerials to said second receiver.

17. In pulse radar apparatus having means for radiating regularly repetitive pulse signals; the combination of a receiving aerial system comprising a reflector with two receiving horns, means for combining the outputs of said two horns separately in phase and in antiphase to provide respectively main beam and auxiliary beam received signals, a first receiver coupled to said combining means for receiving and rectifying the main beam signals to produce a first video frequency output signal, a second receiver coupled to said combining means for receiving and rectifying the auxiliary beam signals to produce a second video frequency output signal, said second receiver including a frequency changer stage and a controllable gain intermediate frequency amplifier stage the gain of which can be varied by an applied gain control signal, combining means for subtractively combining the first and second video frequency output signals, a waveform generator synchronized with the radiated pulses operative to produce a control waveform varying cyclically at the pulse repetition frequency, and means for applying said control waveform from said waveform generator to said controllable gain intermediate frequency amplifier stage as a gain control signal to reduce the gain of said intermediate frequency amplifier stage gradually over at least part of the time period between successive radiated pulses.

References Cited in the file of this patent

UNITED STATES PATENTS

| | | |
|---|---|---|
| 2,804,614 | Alverez | Aug. 27, 1957 |
| 2,825,900 | Collbohm | Mar. 4, 1958 |